United States Patent
Kim

(10) Patent No.: US 7,321,787 B2
(45) Date of Patent: Jan. 22, 2008

(54) POWER MANAGEMENT METHOD AND APPARATUS OF WIRELESS LOCAL AREA NETWORK MODULE IN COMPUTER SYSTEM

(75) Inventor: Hyeong Seog Kim, Suwon-si (KR)

(73) Assignee: LG Electronics Inc., Seoul (KR)

( * ) Notice: Subject to any disclaimer, the term of this patent is extended or adjusted under 35 U.S.C. 154(b) by 467 days.

(21) Appl. No.: 10/620,620

(22) Filed: Jul. 17, 2003

(65) Prior Publication Data

US 2004/0038707 A1 Feb. 26, 2004

(30) Foreign Application Priority Data

Aug. 20, 2002 (KR) .................... 10-2002-0049198

(51) Int. Cl.
*H04B 1/38* (2006.01)
(52) U.S. Cl. .................. 455/574; 455/254; 455/41.2
(58) Field of Classification Search ............ 455/343.1, 455/343.2, 434, 517, 522, 574, 127.5, 343, 455/426.2, 151.2, 41.2; 345/158; 370/311, 370/338, 908
See application file for complete search history.

(56) References Cited

U.S. PATENT DOCUMENTS

| | | | |
|---|---|---|---|
| 5,193,216 A | 3/1993 | Davis | |
| 5,953,646 A | 9/1999 | Hirasawa | |
| 6,058,289 A | 5/2000 | Gardner et al. | |
| 6,192,230 B1 * | 2/2001 | van Bokhorst et al. | 455/343.3 |
| 6,480,476 B1 * | 11/2002 | Willars | 370/311 |
| 6,574,266 B1 * | 6/2003 | Haartsen | 375/133 |
| 6,725,060 B1 * | 4/2004 | Chhatriwala et al. | 455/556.2 |
| 6,760,671 B1 * | 7/2004 | Batcher et al. | 702/60 |
| 6,781,570 B1 * | 8/2004 | Arrigo et al. | 345/158 |
| 6,978,149 B1 * | 12/2005 | Morelli et al. | 455/522 |
| 2002/0132603 A1 * | 9/2002 | Lindskog et al. | 455/343 |

FOREIGN PATENT DOCUMENTS

| | | |
|---|---|---|
| EP | 0 513 710 | 11/1992 |
| EP | 0 903 891 | 3/1999 |
| JP | 60194637 | 10/1985 |

* cited by examiner

*Primary Examiner*—Tu Nguyen
(74) *Attorney, Agent, or Firm*—Ked & Associates, LLP

(57) ABSTRACT

A power management method and apparatus for a wireless LAN module in a computer system may include a communication sensitivity checking unit for checking a communication sensitivity of a wireless communications channel. If a communications sensitivity is lower than a desired value, a power mode of the wireless LAN module is changed into a sleep mode for a predetermined period of time. After the delay period expires, the wireless LAN module is switched back into a normal mode, and the communications sensitivity is checked again. If the communications sensitivity is acceptable, a data checking unit checks to determine whether there is data to be transmitted/received by the wireless LAN module. If no data needs to be sent, at least the transmission block of the wireless LAN module can be set to the power down mode. Also, if an attempt to set up a communications channel is unsuccessful, the device can be set to the power down mode for a predetermined delay period. After the delay period expires, the wireless LAN module is returned to the normal mode for another setup attempt.

14 Claims, 6 Drawing Sheets

POWER MANAGEMENT METHOD AND APPARATUS OF WIRELESS LOCAL AREA NETWORK MODULE IN COMPUTER SYSTEM

BACKGROUND OF THE INVENTION

1. Field of the Invention

The present invention relates to a wireless LAN module in a computer system, and more particularly, to a method of managing power consumption based on a communication sensitivity of a set channel, or based on data traffic that must be processed through the wireless LAN module.

2. Background of the Related Art

In the following descriptions, the term "normal mode" is intended to mean the same thing as the term "working mode," and the term "sleeping mode" is intended to mean the same thing as "power down mode."

In a wireless LAN network system, data is wirelessly transmitted between computer systems which are installed in buildings or in large-sized offices. As shown in FIG. 1, the wireless LAN network system includes computers 6, an access point 4, a hub 3, a router 2 and a server 5. The computers 6 communicate with the access point 4 using a wireless LAN module. Available wireless communications channels are allocated to corresponding computers. This allows the computers 6 to communicate with each other through wireless communications passing through the access point 4. Additionally, the wireless devices may directly establish a LAN with each other in a peer-to-peer communications mode.

The hub 3 is disposed in the middle of a LAN transmission line and functions as a transmission line repeater. The router 2 is a computer or repeater equipment for determining a path of traffic flow in the communication network The router 2 promptly processes message traffic through the Internet 1. In a communications network which connects the computers with the terminals through mesh-shaped paths, the router 2 receives a transferred message and selects a shortest path or an optimal path, and then transmits the message to a reception computer via the selected path.

A wireless LAN module installed in one of the computers 6 operates according to a system power mode (working mode/sleeping mode) determined by a central processing unit (CPU). The wireless LAN module always supervises the system power mode so as to set and change its own power mode according to an I/O request packet (IRP) of the system power mode. If the system power mode of the computer's CPU is the working mode, the wireless LAN module sets its own power mode to the working mode. If the system power mode of the computer's CPU is the sleeping mode, the wireless LAN module sets its own power mode to the sleeping mode.

An operating system (OS) based on the Advanced Configuration and Power Interface Specification (ACPI Specification) directly manages the power mode setting of the computer system.

Because the power mode of a wireless LAN module is set according to the system power mode determined by the CPU, and because the power mode of the wireless LAN module is set without regard to the existence of data which must be processed by the wireless LAN module, when the CPU is operating in the working mode, the wireless LAN module acts as a system load. If no data must be processed by the wireless LAN module, the wireless LAN module consumes power unnecessarily.

SUMMARY OF THE INVENTION

An object of the invention is to solve at least the above problems and/or disadvantages and to provide at least the advantages described hereinafter.

Accordingly, the present invention is directed to a power management method and apparatus of a wireless LAN module that substantially obviates one or more problems due to limitations and disadvantages of the related art.

It is an object of the present invention to provide a power management method and apparatus of a wireless LAN module in which a power mode of the wireless LAN module is set and changed according to a communication sensitivity of a set channel, or based on the existence of data which must be processed by the wireless LAN module.

One embodiment of the invention may include a communication sensitivity checking means for checking a communication sensitivity of a wireless LAN network and a power mode changing means for changing a power mode of a wireless LAN module based on the checked communication sensitivity. Other embodiments may include a data checking means for checking whether there is data to be transmitted/received by the wireless LAN module, and a power mode changing means for changing a power mode of a wireless LAN module based on the need to communicate data.

A method embodying the invention may include the steps of: (a) setting up a channel to configure the wireless LAN network; (b) checking a communication sensitivity of the set channel; and (c) changing a power mode of the wireless LAN device based on the channel setup and/or the checked transmission sensitivity. The method may further include the steps of checking whether data needs to be transmitted or received by the wireless LAN module, and changing the power mode based on the results of the checking step.

It is possible to change the power mode of the wireless LAN module according to the communication sensitivity of the set channel, or based on the existence of data to be processed by the wireless LAN module. Methods embodying the invention prevent unnecessary power consumption of the wireless LAN module and thereby reduce a system load.

Additional advantages, objects, and features of the invention will be set forth in part in the description which follows and in part will become apparent to those having ordinary skill in the art upon examination of the following or may be learned from practice of the invention. The objects and advantages of the invention maybe realized and attained as particularly pointed out in the appended claims.

BRIEF DESCRIPTION OF THE DRAWINGS

The invention will be described in detail with reference to the following drawings in which like reference numerals refer to like elements, and wherein.

DETAILED DESCRIPTION OF PREFERRED EMBODIMENTS

Figure 1:
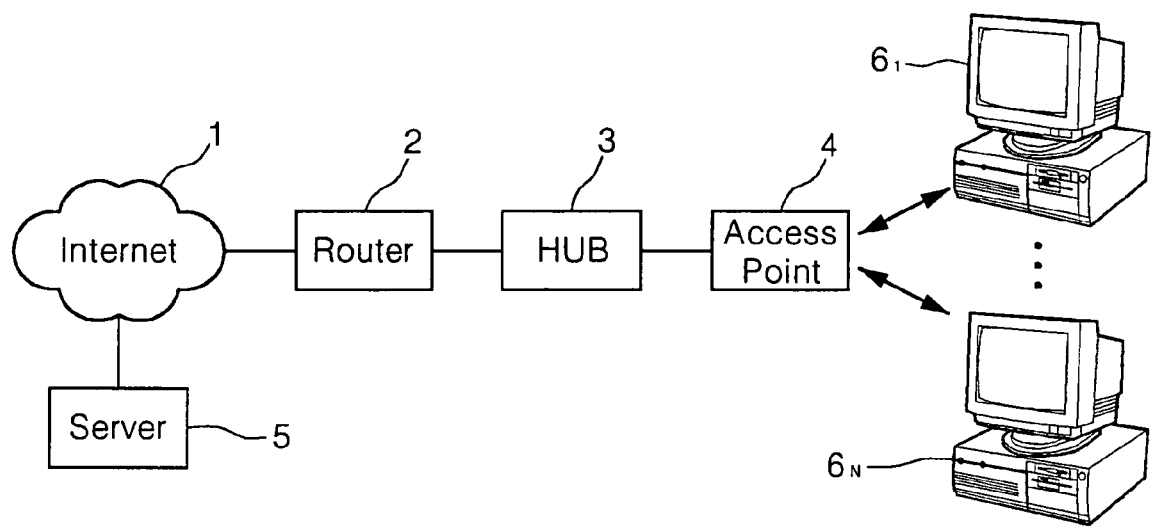
FIG. 1 is a block diagram of a general wireless LAN system.
Figure 2:
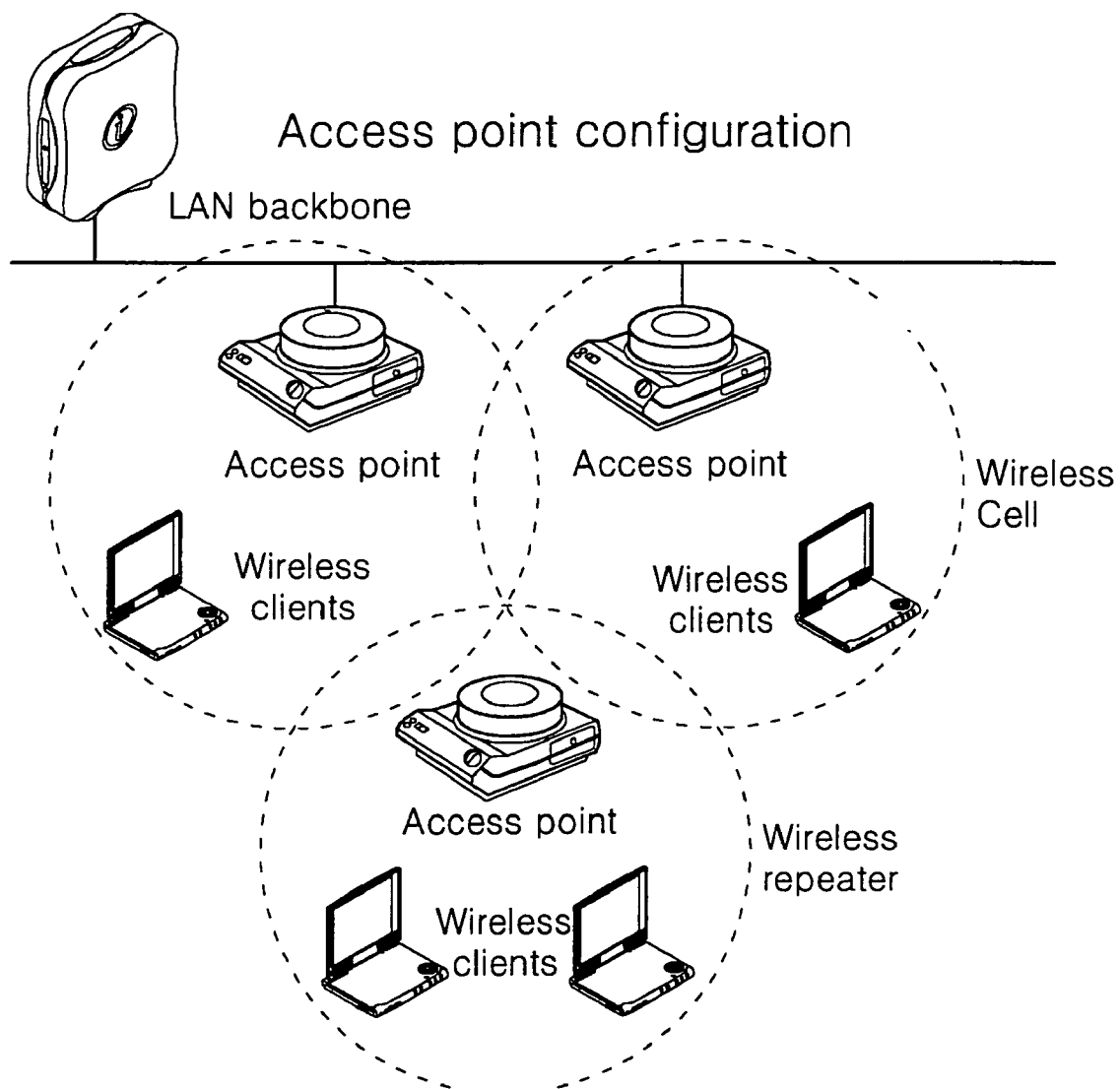
FIG. 2 shows a communication system configuration using an access point in accordance with the present invention.

FIG. 2 is a block diagram of a communication system configuration using an access point in accordance with the present invention. The access point is a bridge that connects a wireless client device to a wired network.

While the bridge determines only whether to pass data, a router analyzes a protocol contained in the data, selects an optimal path, and then transfers the data via the selected path.

In an access point based topology, the access point bridges the traffic through a wired (Ethernet or token ring) or wireless backbone. The access point enables a wireless client device to communicate with other wired or wireless devices on the network.

Figure 3:
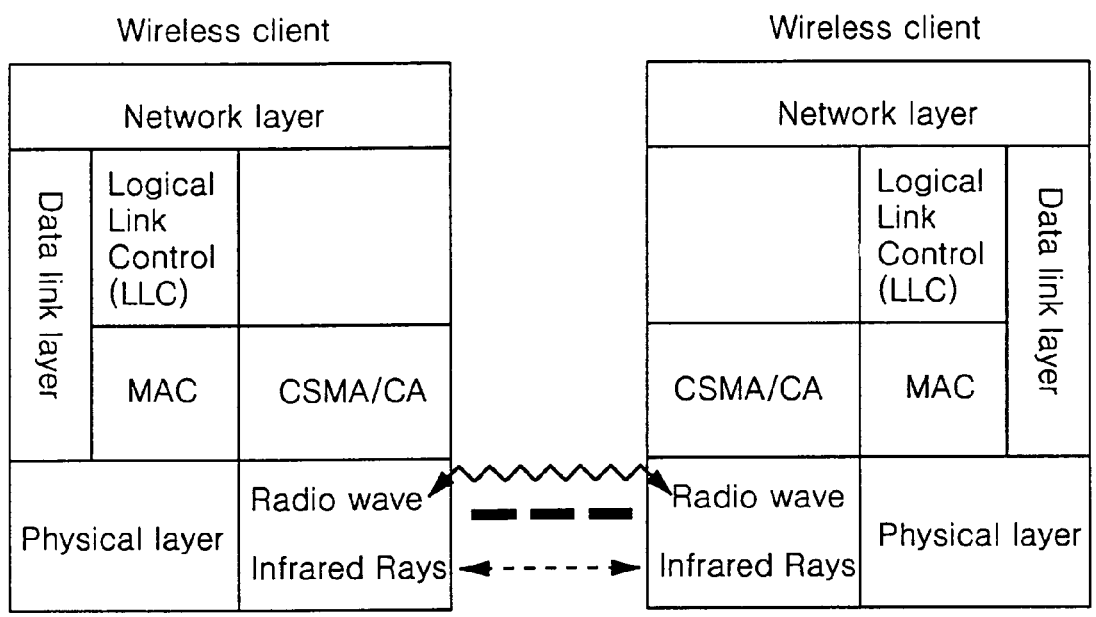
FIG. 3 shows an overall configuration of a wireless LAN.

In preferred embodiments, the access point supports essential IEEE 802.11 Protocol. A wireless LAN standard (IEEE 802.11) includes Home RF, Bluetooth, and the like, which is Shared Wireless Access Protocol (SWAP) for wireless networking on the basis of the WLI Forum Open Air of 2.4 GHz frequency hopping spread spectrum. As one example, a principle of the IEEE 802.11 standard wireless LAN will be described with reference to FIG. 3. FIG. 3 shows an overall configuration of a wireless LAN.

The IEEE 802.11 Working Group leads a standardization of a physical (PHY) layer and a media access control (MAC) layer in the wireless LAN. A Frequency hopping (FH) mode and a direct sequence (DS) mode using 26 MHz in a 2.4 GHz band (which is called an industrial scientific medical (ISM) band) are standardized in the PHY layer. A wireless packet access uses carrier sense media access/collision avoidance (CSMA/CA) as a most typical method. The CSMA/CA is a kind of random access that does not reserve bandwidth.

In order to reduce or avoid a packet collision, a carrier sense algorithm is used to monitor a state of the line to be used after the arrival of transmitted data, not based on the arrival of the transmission data. In the wireless data transmission, the carrier sense is determined according to the existence of signal power on the line.

Generally, the wireless access interface protocol consists of a PHY layer, a data link layer and a network layer. These layers can be classified as layer 1 (L1), layer 2 (L2) and layer 3 (L3) on the basis of the lower three layers of the Open System Interface (OSI) 7-layer model, which is well known in the field of communications.

Layer 1 (L1) functions as the PHY layer of the wireless interface and is connected through transport channels to the MAC layer which is disposed in the upper portion. Additionally, layer 1 (L1) functions to transmit data, which is transferred through the transport channels of the PHY layer, to a reception side using various coding and modulation methods suitable for the wireless environment.

The transport channels existing between the PHY layer and the MAC layer are classified into a dedicated transport channel and a common transport channel, based on whether one terminal uses the transport channel exclusively, or whether several terminals uses the transport channel commonly.

Layer 2 (L2) functions as the data line layer and allows several terminals to share the wireless resources. The MAC layer transmits data through a proper mapping relationship between a logical channel and a transmission channel. Various logical channels are provided according to the kind of information that is transmitted to channels for connecting an upper layer with the MAC layer.

Generally, when information of a control plane is transmitted, a control channel is used. When information of a user plane is transmitted, a traffic channel is used.

The network layer of layer 3 manages the controls of the transmission channel and the physical channel in relation to setup/reset/release of a radio carrier. At this time, the radio carrier is set up. The setup of the radio carrier (RB setup) means a definition of characteristics of the protocol layers and channels required to provide a specific service, and a process of setting respective parameters and an operation method.

Figure 4:
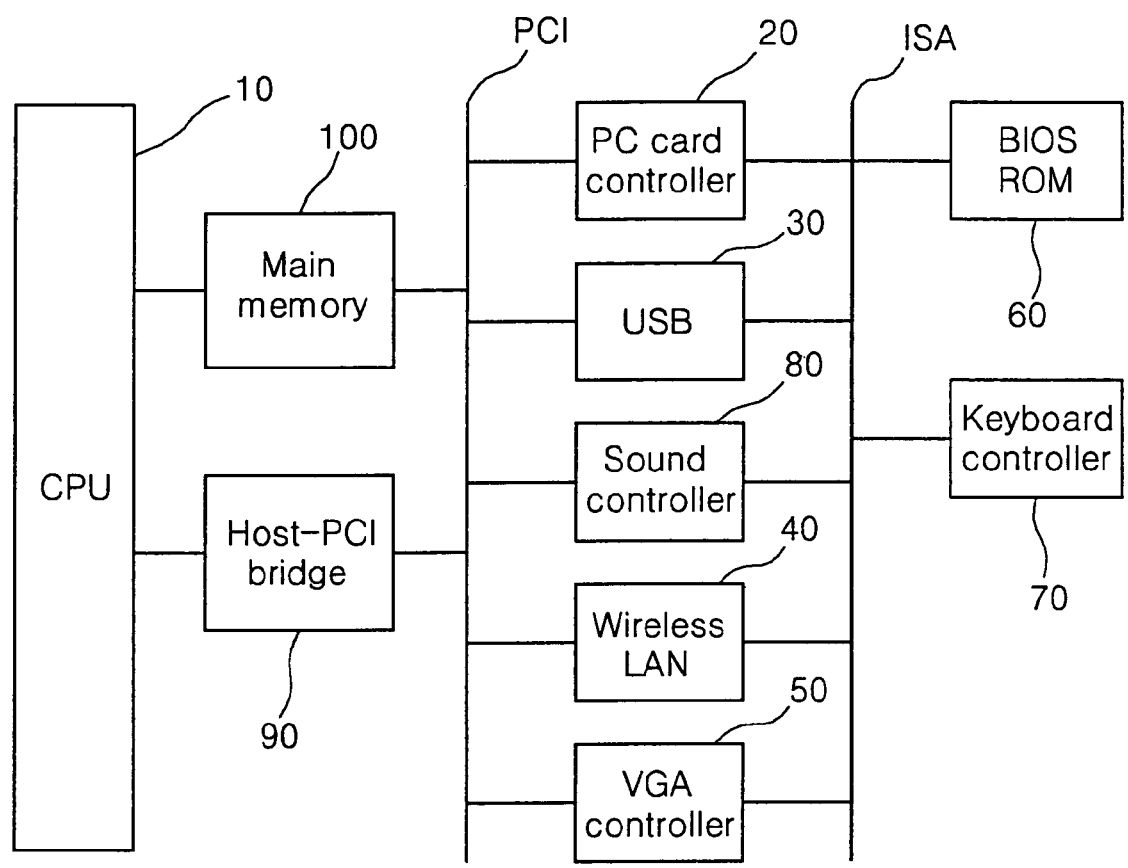
FIG. 4 is a block diagram of a computer system configuration in accordance with the present invention.

FIG. 4 is a block diagram of a computer system configuration in accordance with the present invention. Referring to FIG. 4, the computer system includes a CPU 10, a PC card controller 20, a universal serial bus (USB) controller 30, a wireless LAN module 40, a video graphics adaptor (VGA) controller 50, a BIOs ROM 60, a keyboard controller 70, a sound controller 80, a Host-PCI bridge 90, and a main memory 100. The wireless LAN module 40 performs a bus communication with the CPU 10 and sets communicable channels, thereby achieving a wireless communication with wireless LAN modules of other computer systems, or with an access point. The wireless LAN module can be mounted on a system board or be formed in a shape of a PCI-type adaptor card.

Figure 5:
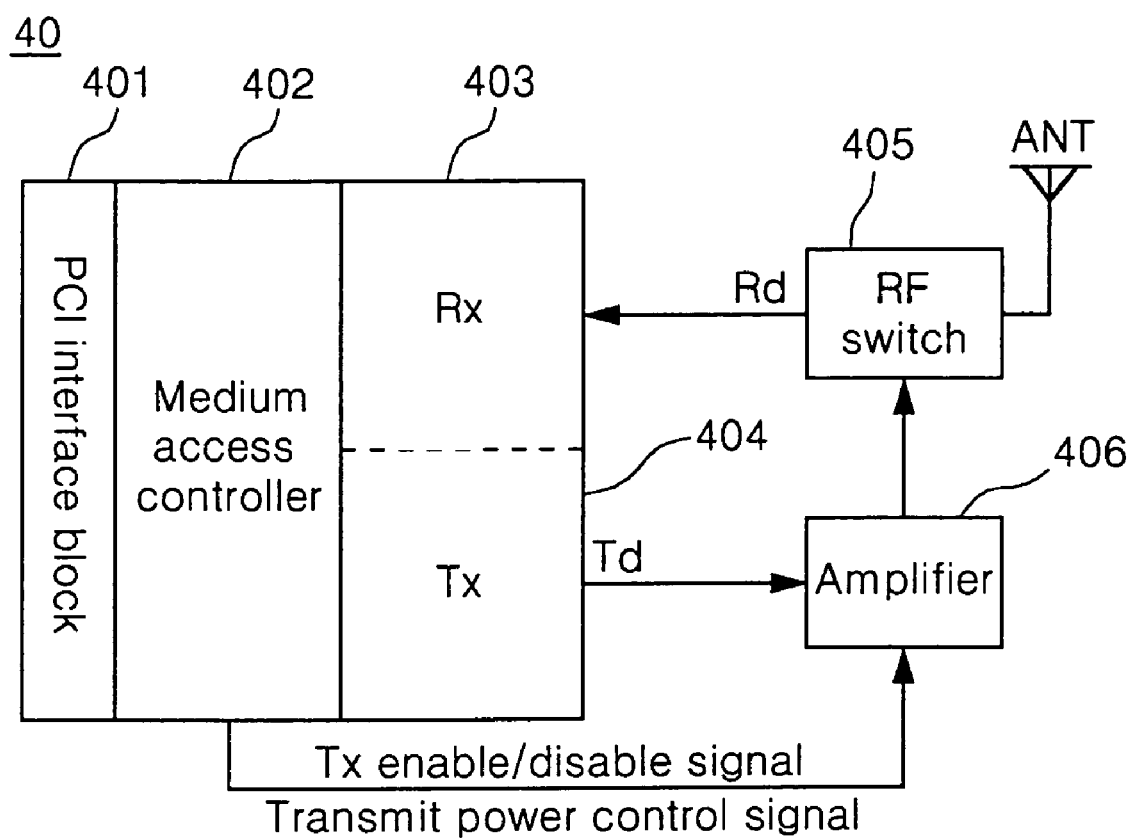
FIG. 5 is a block diagram of a wireless LAN module in accordance with the present invention.

FIG. 5 is a block diagram showing a detailed configuration of the wireless LAN module 40 shown in FIG. 4. Referring to FIG. 5, the wireless LAN module 40 includes a PCI interface block 401 for interfacing with a peripheral component interconnect (PCI) bus directly connected to the CPU 10; a MAC controller 402 for communicating with the CPU through the PCI interface block 401, and for processing data to be transmitted/received to/from other computer systems through a predefined protocol; a reception block 403 for processing data to be received from other computer systems under a control of the MAC controller 402; a transmission block 404 for processing data to be transmitted to other computer systems under a control of the MAC controller 402; a transmission amplification block 406 for amplifying an output of the transmission data processed at the transmission block 404; and an RF switching block 405 for selectively switching RF signals inputted from the transmission amplification block 406 or an antenna ANT.

The wireless LAN module 40 performs a series of communication operations, such as a channel setup operation, together with one or more access points 4 existing within a predetermined area.

In the wireless LAN module 40 described above, the MAC controller 402 performs signal processing of I/O request packets (IRP) transmitted from the CPU 10 through the PCI interface block 401, and then transmits the processed I/O request packet data to the transmission block 404. The MAC controller 402 also performs signal processing of data received from other computer systems through the reception block 403, and then transmits the processed data to the CPU 10. Upon initialization, the MAC controller 402 scans and sets channels that can support wireless communications with other computer systems. Then, the MAC controller 402 checks a communication sensitivity of the set channels, and controls the operation of the transmission block 404 to send packet data transmitted from the CPU.

The scan of the communication channels and the check of the communication sensitivity can be achieved by the wireless LAN module 40 or by a system BIOS.

During the channel setup operation performed by the MAC controller 402, if the currently available channels are not being used to communicate data, the power mode is changed into a sleep mode, or a deep sleep mode to cut off power to any of the components except for the PCI interface block 401. When in the sleep mode, power is not provided to the reception block 403, the transmission block 404, the transmission amplification block 406 or the RF switching block 405.

The deeper sleep mode represents a sleep mode that is higher than the normal sleep mode by one level.

In some embodiments of the invention, the MAC controller 402 enables or disables the reception block 404 based on a data attribute which is obtained by determining whether the transmission block 404 is needed to send data transmitted from the CPU.

The MAC controller 402 can also transmit a power control signal to cut off power to the RF switching block 405.

Figure 6:
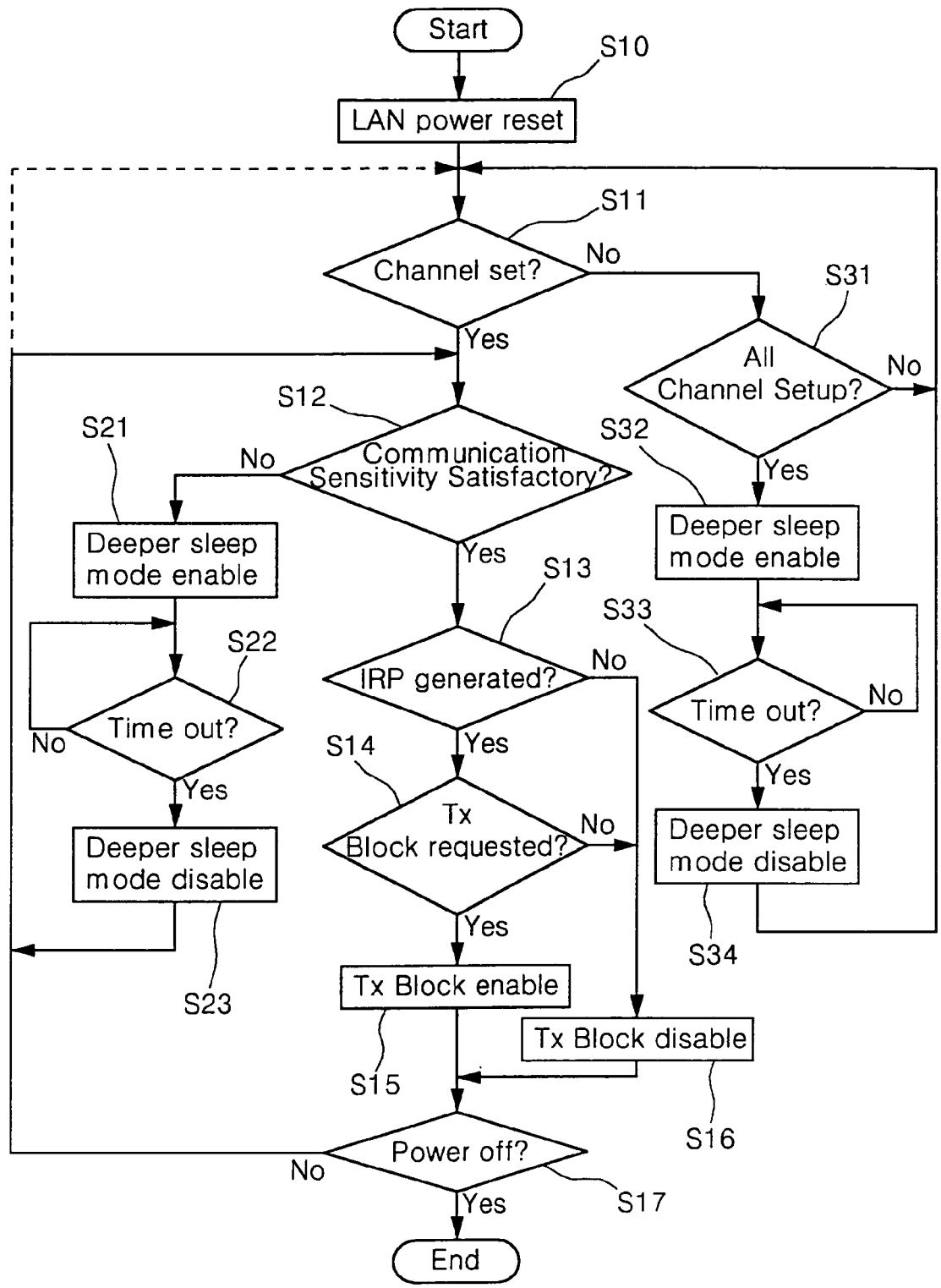
FIG. 6 is an operational flowchart showing a power management method of a wireless LAN module in a computer system in accordance with the present invention.

FIG. 6 is an operational flowchart showing a power management method performed by a wireless LAN module in a computer system embodying with the present invention. Referring to FIG. 6, if the wireless LAN module 40 is reset (S10) during an initialization mode, the MAC controller 402 performs sequential channel setup operations for all available channels through data transmission/reception with an access point 4 based on respective channel information (S11).

After channel setup is accomplished, a check is performed to determine whether a communication sensitivity of the corresponding set channels is satisfactory (S12). If the communicated sensitivity of the set channel is lower than a predefined reference communication sensitivity, in other words, if not satisfactory, the power modes of all the components of the wireless LAN module 40 except for the PCI interface block 401 are changed into the deeper sleep mode (S21). For example, in some embodiments, if the communication sensitivity is 70 percent or less, the power mode is changed into the deeper sleep mode (S21). If the sensitivity is greater than 70 percent, the power mode is changed into a full power mode, i.e., the normal mode. The 70-percent communication sensitivity is merely an example. The sensitivity amount that would trigger a sleep mode can be increased or decreased according to communication conditions. Also, in some embodiments of the invention, the user may be able to change the sensitivity level that will cause the wireless communications device to enter the sleep mode.

If the power mode is changed into the deeper sleep mode, the MAC controller 402 counts the duration time of the deeper sleep mode. After a predefined time (e.g., 1 msec) elapses, the deeper sleep mode is disabled and the process returns to the step S12. Thus, the MAC controller 402 repeatedly performs the sensitivity measurement operation.

In other words, after a predefined period of time has elapsed since the deeper sleep mode was set, the deeper sleep mode is canceled, (S23) and the communication sensitivity is rechecked. If the communication sensitivity is not satisfactory, the above steps S21 to S23 are repeated. Accordingly, when the wireless LAN module is idle, power consumption can be reduced.

According to another embodiment of the present invention, first, the channel is set (S11). If the communication sensitivity is less than the predefined reference value (70 percent) but maintains the lowest level (e.g., 50 percent or more) for a predetermined time, the deeper sleep mode is enabled (S21). After a predetermined time (which is generally longer than a time corresponding to the predetermined reference value (70 percent)), the deeper sleep mode is disabled (S23). Then, after periodically checking the communication sensitivity of the set channel, the deeper sleep mode is started, so that the power consumption is reduced.

If the communication sensitivity is 50 percent or less, the time-out (wake-up time) is extended longer compared with the case when the communication sensitivity is 50 percent or more, so that power consumption can be reduced as much as the extended time period. If the communication sensitivity is 50 percent or less, the time-out value can be set to, for example, 50 msec.

According to the present invention, the MAC controller 402 can measure the communication sensitivity by comparing the radio wave received through the antenna ANT with the signal amplified through the RF switching block and the information previously inputted into the main memory 100.

Additionally, the CPU 10 can perform the power management by periodically checking whether or not the data is transmitted/received to/from the access point 4, and the power management can be achieved at the MAC controller.

The above channel setup operation is performed with respect to all available channels. If the current scanned channel does not satisfy the setup conditions, the above-described channel setup operations are repeatedly performed with respect to the next channel. The MAC controller 402 performs the above-described channel setup operations for all available channels (S31). Then, if there are no more channels that can be set, the power mode of the wireless LAN module 40 is changed into the deeper sleep mode (S32).

If the power mode of the wireless LAN module 40 is changed into the deeper sleep mode, the MAC controller 402 counts the duration time of the deeper sleep mode (S33). After a predefined time (e.g., 2 sec) elapses, the deeper sleep mode is disabled (S34) and the process returns to the step S11, so that a series of channel setup operations are repeatedly performed.

Here, if the wireless LAN module 40 is not associated with any AP, the OS (not shown) of the system requests the wireless LAN module 40 to check whether or not there is an available access point 40 at two-second intervals.

It is possible to save the power of the wireless LAN module 40 by reducing AP scanning frequency and using the information which is caching the latest access point scanning result for a long time. "Caching" means that commands and data are temporarily stored into a cache memory or a disk cache. The caching is one method for improving the system performance. According to the caching, the CPU can read out or write commands and data at higher speed or almost at CPU speed, compared with the case that commands and data are read/written from/to a main memory device or disk In the transmission power control, if the wireless LAN module 40 is adjacent to the access point, the power output level of the RF amplification block 406 can be transmitted at a much lower level.

As an embodiment of the present invention, if the access point is disposed at an adjacent place, in other words, if the signal sensitivity is great, the MAC controller 402 is controlled using a transmission power control signal so that the MAC controller can change the transmission power of the amplifier 406 to a low level. Therefore, the power consumption of the wireless LAN module 40 can be reduced due to the lowered transmission power.

Additionally, the wireless LAN module 40 can be replaced with a Bluetooth module. In case of a Bluetooth module, the above-described operations can be carried out when other systems with the Bluetooth module, except for the access point, communicates with a Bluetooth antenna installed in the system with the Bluetooth module.

Additionally, if the system is in an AC adapter mode, the power mode of the wireless LAN module 40 can operate in an active mode which has no power saving. If the system is in a battery only mode, the wireless LAN module 40 can be set to operate in a power save mode. Here, the "power save mode" means that the sleep mode and the wake-up mode are repeated.

Meanwhile, the MAC controller 402 checks the communication sensitivity of the current set channel. If the checked communication sensitivity is excellent, it is checked whether or not the I/O packet data is received through the PCI interface block 401 (S13). If I/O packet data is received, it is determined whether or not the I/O packet data requests the transmission block 404, by checking the attribute of the I/O packet data (S14).

The I/O request packet (IRP) causes all data of a user program to be changed into IRP through an I/O manager of the OS and transmits them to a driver of the wireless LAN module 400.

The driver of the wireless LAN module 400 consists of several dispatch routines, including a create dispatch routine for processing an IRP generated when using the wireless LAN module 400, a power dispatch routine for processing a power IRP used to change or scan the power of the module, and a PNP dispatch routine for processing IRP related to an installation/removal/operation of the device.

It is determined whether the data attribute of the IRP is a receive data or a transmit data. If the I/O packet data is not a data requiring the transmission block 404, the power mode of the transmission block 404 is changed into the power down mode, and simultaneously the power of the amplifier 406 is eliminated using the Tx enable/disable signal of FIG. 3, so that the power is saved.

If the I/O packet data is a data requiring the transmission block 404, the power mode of the transmission block 404 is changed into the working mode (S15). Additionally, at the same time, the power is supplied to the amplifier 406.

Meanwhile, if the I/O packet data is not received, the power mode of the transmission block 404 is changed into the sleep mode (S16), and then it is checked whether or not the power is off (S17). If the power is not off, the process proceeds to the step S13. Therefore, the above-described processes are repeatedly performed according to the reception of the I/O packet data.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A wireless communications device, comprising:
   a communication sensitivity checking portion of the wireless communications device configured to check a sensitivity of at least one communications channel used to communicate with an external access point and to provide a sensitivity signal based on the checked sensitivity; and
   a power mode changing portion of the wireless communications device configured to receive the sensitivity signal from the communication sensitivity checking portion and to change a power mode of the wireless communications device between a working mode and at least one sleep mode based on the sensitivity signal received from the communication sensitivity checking portion, wherein the power mode changing portion is configured to switch the power mode into the working mode once a predetermined time period elapses after the power mode has been switched to the at least one sleep mode, and wherein a length of the predetermined time period varies based on a value of a predefined sensitivity value.

2. The device of claim 1, wherein the power mode changing portion is configured to change the power mode of the wireless communications device into the working mode if the sensitivity signal indicates that the communications sensitivity is greater than a predefined reference value, and wherein the power mode changing portion is configured to change the power mode of the wireless communications device into the at least one sleep mode if the sensitivity signal indicates that the communications sensitivity is less than the predefined sensitivity value.

3. The device of claim 2, wherein the predefined sensitivity value can be changed by a user.

4. The device of claim 2, wherein when the wireless communications device is in the sleep mode, both a transmission portion and a receive portion of the wireless communications device are put in a power down mode.

5. The device of claim 1, further comprising a data checking portion configured to determine whether data needs to be transmitted to the external access point and configured to output a data check signal, and wherein the power mode changing portion is also configured to change the power mode of the wireless communications device based on the data check signal.

6. The device of claim 5, wherein the power changing mode portion is configured to change the power mode of the wireless communications device into a transmission sleep mode if the data check signal indicates that there is no data to be transmitted, and wherein the power changing mode portion is configured to change the power mode of the wireless communications device into the working mode if the data check signal indicates that there is data to be transmitted.

7. The device of claim 6, wherein the at least one sleep mode includes a transmission sleep mode, and when the wireless communications device is in the transmission sleep mode, only a transmission portion of wireless communications device is in a power down mode.

8. The device of claim 1, wherein the wireless communication device comprises a wireless local area network ELAN) module.

9. A wireless LAN module, comprising:
   checking means for checking a communication sensitivity of at least one communications channel;
   switching means for switching a power mode of the wireless LAN module to a power down mode when the checking means determines that a communication sensitivity is less than a predefined sensitivity value, and wherein the switching means is also configured to switch the power mode of the wireless LAN module to a normal mode after a predetermined delay period elapses after the power mode has been set to the power down mode, when the checking means wherein determines that the communications sensitivity is less than a first predetermined sensitivity value, the switching means switches the power mode of the wireless LAN module to a normal mode after a first predetermined delay period elapses after the power mode has been set to the power down mode, and wherein when the checking means determines that the communications sensitivity is less than a second predetermined sensitivity valuer the switching means switches the power mode of the wireless LAN module to the normal mode after a second predetermined delay period elapses after the power mode has been set to the power down mode.

10. The module of claim 9, wherein the predefined sensitivity value is approximately 70 percent.

11. The module of claim 9, wherein the switching means is configured such that if the checked communication sensitivity is more than the predefined sensitivity value, a power mode of a transmission block of the wireless LAN module is set to the power down mode if no data needs to be transmitted by the wireless LAN module.

12. A power management method of a wireless local area network (LAN) module, comprising:
   setting up a communications channel of a wireless LAN network;
   checking a communications sensitivity of the set channel;
   changing a power mode of the wireless LAN module to a sleep mode when a result of the checking indicates that the communications sensitivity is less than a predetermined sensitivity value; and
   changing a power mode of the wireless LAN module back to a working mode after a predetermined delay period expires after the wireless LAN module is set to the sleep mode, wherein when a result of the checking indicates that the communications sensitivity is less than a first predetermined sensitivity value, the power mode of the wireless LAN module is changed back to the working mode after a first predetermined delay period expires, and wherein when a result of the checking indicates that the communications sensitivity is less than a second predetermined sensitivity value, the power mode of the wireless LAN module is changed back to the working mode after a second predetermined delay period expires.

13. The method of claim 12, wherein if the result of the checking indicates that the communications sensitivity is greater than the predetermined sensitivity value, the method further comprises:
   checking to determine if data must be transmitted by the wireless LAN module; and
   changing the power mode of a transmission block of the wireless LAN module to the sleep mode if a result of the checking indicates that no data must be transmitted.

14. A method of setting up a wireless LAN module to achieve power savings, comprising:
   attempting to set up a wireless communications channel;
   checking to determine if the channel was properly set up;
   changing a power mode of the wireless LAN module to a power down mode when a result of the checking indicates that the channel was not properly set up; and
   changing the power mode of the wireless LAN module to a normal mode after a predetermined delay period expires after the power mode of the wireless LAN module is set to the power down mode, wherein when a communication channel is not successfully set up after a predetermined number of setup attempts are made, the method further comprises:
   changing the power mode of the wireless LAN module to the power down mode, and
   changing the power mode of the wireless LAN module to a normal mode after a second predetermined delay period expires after the power mode of the wireless LAN module is set to the power down mode, wherein the second predetermined delay period is longer than the first predetermined delay period used after an unsuccessful setup attempt.

* * * * *